United States Patent
Ting (10) Patent No.: US 8,446,260 B2
(45) Date of Patent: May 21, 2013

(54) GROUP PROVING METHOD AND RADIO FREQUENCY IDENTIFICATION READER AND TAGS USING THEREOF

(75) Inventor: Wei-Chih Ting, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 456 days.

(21) Appl. No.: 12/859,008

(22) Filed: Aug. 18, 2010

(65) Prior Publication Data

US 2011/0128130 A1    Jun. 2, 2011

Related U.S. Application Data

(60) Provisional application No. 61/264,916, filed on Nov. 30, 2009.

(30) Foreign Application Priority Data

Jun. 3, 2010 (TW) .............................. 99117896 A (51) Int. Cl.
    *H04Q 5/22* (2006.01)
(52) U.S. Cl.
    USPC ..... 340/10.42; 340/10.1; 340/10.2; 340/10.3; 340/10.31; 340/10.32; 340/10.33; 340/10.34; 340/10.4; 340/10.41; 340/10.5; 340/10.51; 340/10.52; 340/10.6; 235/375; 235/376; 235/377; 235/378; 235/379; 235/380; 235/381; 235/382; 235/382.5; 235/383; 235/384; 235/385
(58) Field of Classification Search
    USPC ... 340/10.1–10.6, 572.1–572.9; 235/375–385
    See application file for complete search history.

(56) References Cited

U.S. PATENT DOCUMENTS

| 5,686,902 | A * | 11/1997 | Reis et al. ..................... 340/10.2 |
| 7,193,504 | B2 * | 3/2007 | Carrender et al. ............ 340/10.4 |
| 7,348,886 | B2 * | 3/2008 | Himberger et al. ........ 340/572.1 |
| 7,450,010 | B1 * | 11/2008 | Gravelle et al. ............ 340/572.1 |

(Continued)

FOREIGN PATENT DOCUMENTS

CN       101246538 A      8/2008

OTHER PUBLICATIONS

Sun, H.M, et al.; "Parallel RFID Grouping Proof;" The Computer Journal; 2009; pp. 1-10.

(Continued)

*Primary Examiner* — George Bugg
*Assistant Examiner* — Paul Obiniyi
(74) *Attorney, Agent, or Firm* — McClure, Qualey & Rodack, LLP (57) ABSTRACT

A group proving method includes the following steps. First, a query command is broadcasted to radio frequency identification (RFID) tags, each of which responds the query command with tag identification data. Next, a first round parameter is generated and broadcasted according to the tag identification data, and each RFID tag responds the first round parameter with a first response parameter. Then, a second round parameter is generated and broadcasted according to the first response parameter, and each RFID tag determines whether the second round parameter is received in a predetermined period after the first round parameter was received and whether the first and second round parameters correspond to each other. If so, each RFID tag updates its tag key according to a random number parameter and outputs a second response parameter. Thereafter, group proving data are generated according to the above-mentioned data.

17 Claims, 7 Drawing Sheets

U.S. PATENT DOCUMENTS

| | | | | |
|---|---|---|---|---|
| 8,031,055 | B2* | 10/2011 | Kim et al. | 340/10.51 |
| 8,154,405 | B2* | 4/2012 | Gravelle et al. | 340/572.1 |
| 8,279,047 | B2* | 10/2012 | Carrender et al. | 340/10.4 |
| 8,344,853 | B1* | 1/2013 | Warner et al. | 340/10.1 |
| 8,344,886 | B2* | 1/2013 | Gravelle et al. | 340/572.1 |
| 8,379,811 | B2* | 2/2013 | Bao | 379/110.01 |
| 2003/0137403 | A1* | 7/2003 | Carrender et al. | 340/10.4 |
| 2004/0100363 | A1 | 5/2004 | Lane et al. | |
| 2005/0247779 | A1* | 11/2005 | Ohkubo et al. | 235/383 |
| 2006/0287078 | A1 | 12/2006 | Smolucha et al. | |
| 2007/0013484 | A1* | 1/2007 | Carrender et al. | 340/10.4 |
| 2007/0028116 | A1* | 2/2007 | Murison et al. | 713/181 |
| 2007/0164863 | A1* | 7/2007 | Himberger et al. | 340/572.1 |
| 2007/0279194 | A1* | 12/2007 | Carrender et al. | 340/10.4 |
| 2008/0061982 | A1* | 3/2008 | Himberger et al. | 340/572.1 |
| 2008/0100442 | A1* | 5/2008 | Grunwald et al. | 340/572.1 |
| 2008/0100443 | A1* | 5/2008 | Grunwald et al. | 340/572.1 |
| 2009/0096584 | A1* | 4/2009 | Gravelle et al. | 340/10.1 |
| 2009/0102606 | A1* | 4/2009 | Kim et al. | 340/10.1 |
| 2010/0001840 | A1* | 1/2010 | Kang et al. | 340/10.1 |
| 2010/0146273 | A1* | 6/2010 | Kang et al. | 713/168 |
| 2010/0239079 | A1* | 9/2010 | Bao | 379/110.01 |
| 2011/0039592 | A1* | 2/2011 | Haddad et al. | 455/515 |
| 2011/0057779 | A1* | 3/2011 | Canard et al. | 340/10.42 |

OTHER PUBLICATIONS

Sun, H.M., et al; "Offlined Simultaneous Grouping Proof for RFID Tags;" pp. 1-6, 2009.

Huang, H.H., et al.; "A RFID Grouping Proof Protocol for Medication Safety of Inpatient;" Journal of Medical Systems; 2008; pp. 1-8.

Lin, C.C., et al.; "Coexistence Proof Using Chain of Timestamps for Multiple RFID Tags;" 2007; pp. 634-643.

Cho, J.S., et al.; "Enhanced Yoking Proof Protocols for RFID Tags and Tag Groups;" 22nd International Conference on Advanced Information Networking and Applications; 2008; pp. 1591-1596.

Bolotnyy, L., et al.; "Generalized"Yoking-Proofs: for a Group of RFID Tags; 2006; pp. 1-4.

Saito, J., et al.; "Grouping Proof for RFID Tags;" pp. 1-4, 2005.

Juels, A.; "Yoking-Proofs" for RFID Tags; pp. 1-6, 2004.

Piramuthu, S.; "On Existence Proofs for Multiple RFID Tags;" 2006; pp. 317-320.

Burmester, M., et al.; "Provably Secure Grouping-Proofs for RFID Tags;" pp. 1-20, 2008.

Lien, Y., et al.; "Reading Order Independent Grouping Proof for RFID Tags;" 2008; pp. 128-136.

Peris-Lopez, P., et al.; "Solving Simultaneous Scanning Problem Anonymously: Clumping Proofs for RFID Tags;" The International Workshop on Security Privacy and Trust in Pervasive and Ubiquitous Computing; 2007; pp. 1-6.

Huang, H.H., et al.; "A RFID Grouping Proof Protocol for Medication Safety of Inpatient;" 2009; pp. 467-474.

Nuamcherm, T., et al.; "An Improved Proof for RFID Tags;" pp. 1-4, 2008.

Leng, X., et al.; "Select-Response Grouping Proof for RFID Tags;" 2009; pp. 73-77.

Duc, D.N., et al.; "Grouping-Proof Protocol for RFID Tags: Security Definition and Scalable Construction;" 2009; pp. 1-9.

Zuo, Y., "Secure and Private Search Protocols for RFID Systems;" 2009; pp. 1-13.

Chien, H.Y., et al; "Tree-Based RFID Yoking Proof;" 2009 International Conference on Networks Security, Wireless Communications and Trusted Computing; 2009; pp. 550-553.

Chien, H.Y., et al.; "Two RFID-Based Solutions to Enhance Inpatient Medication Safety;" 2009; pp. 1-7.

English Abstract translation of CN101246538 (Published Aug. 20, 2008).

CN Office Action dated Dec. 27, 2012.

"A Gent-Based RFID Authentication Protocol for Security and Privacy" Hung-Min Sun el al, "IEEE Transactions on Mobile Computing", vol. 8, No. 8, Aug., 2009, pp. 1052-1060 and Figs. 1-8.

\* cited by examiner

GROUP PROVING METHOD AND RADIO FREQUENCY IDENTIFICATION READER AND TAGS USING THEREOF

This application claims the benefit of US provisional application Ser. No. 61/264,916, filed Nov. 30, 2009, and Taiwan application Serial No. 099117896, filed Jun. 3, 2010, the subject matter of which is incorporated herein by reference.

TECHNICAL FIELD

The disclosure relates in general to a group proving method, and more particularly to a group proving method applied to a proving operation between radio frequency identification (RFID) tags and a RFID reader.

BACKGROUND

In the modern age, in which the technology is changing with each passing day, the radio frequency identification (RFID) technology is developed and widely applied to many logistics management occasions. Generally speaking, the existing RFID proving mechanism frequently adopts the single item auditing, that is, determines whether the contents corresponding to the product database match with the article to be tagged. In other words, the existing RFID proving mechanism cannot prove that all RFID tags are allocated at the same time. Consequently, when the person with bad intent sniffs and copies the RFID tags through the electronic recorder and thus interchanges the article originally labeled with the RFID tags, the checker cannot check the condition of the interchanged article according to the existing RFID proving mechanism. Thus, it is an important subject in the industry to provide a RFID proving method capable of effectively overcoming the drawbacks of the single item auditing mechanism.

SUMMARY

The disclosure is directed to a group proving method for performing signal exchanging operations with radio frequency identification (RFID) tags through a RFID reader in parallel so as to generate a group proof electric record capable of proofing that all the RFID tags co-exist. The RFID tags adopting the associated group proving method do not have a group key. In other words, the RFID tags do not have the group dependent relationship. The RFID tags and the RFID reader adopting the associated group proving method have the sufficient computing power to perform the calculating operations of key encrypting, hashing and random number generating, so that the group proving method can be performed in an off-line situation with the RFID tags and the RFID reader being disconnected with the verification server. Thus, compared to the conventional RFID technology, the disclosed group proving method has the advantages of effectively generating one set or multiple sets of group proving data with different article classes in the off-line situation through parallel signal exchanging operations between the RFID reader and the RFID tags.

According to a first aspect of the present disclosure, a group proving method applied to a plurality of radio frequency identification (RFID) tags to perform a group proving operation together with a RFID reader is provided. The group proving method includes the following steps. First, a random number parameter is generated in response to a first round parameter provided by the RFID reader, wherein the first round parameter relates to tag identification data of each of the RFID tags. Next, a first response parameter is generated according to the first round parameter, the random number parameter and a tag key. Then, it is determined whether each of the RFID tags receives a second round parameter provided by the RFID reader in a predetermined period after an initial time point of receiving the first round parameter, wherein the second round parameter relates to the first response parameter of the RFID tags. Then, it is determined whether the first and second round parameters correspond to each other. Next, the tag key is updated according to the random number parameter when the first and second round parameters correspond to each other and the second round parameter is received in the predetermined period after the initial time point. Then, a second response parameter is generated and outputted according to the second round parameter, the random number parameter and the updated tag key.

According to a second aspect of the present disclosure, a group proving method applied to a radio frequency identification (RFID) reader to perform a group proving operation together with a plurality of RFID tags is provided. The group proving method includes the following steps. First, a query command is broadcasted, wherein each of the RFID tags responds the query command with tag identification data. Next, a tag set is determined according to the received tag identification data, and a first round parameter is generated and broadcasted. Each of the RFID tags responds the first round parameter with a first response parameter, and the first response parameter relates to the first round parameter, a tag key of each of the RFID tags and a random number parameter generated by each of the RFID tags. Then, a second round parameter is generated and broadcasted according to the first response parameter corresponding to each of the RFID tags. Each of the RFID tags determines whether the second round parameter is received in a predetermined period after an initial time point of receiving the first round parameter and whether the first and second round parameters correspond to each other, and each of the RFID tags updates the tag key according to the random number parameter, and generates and outputs a second response parameter according to the second round parameter, the random number parameter and the updated tag key if the second round parameter is received in the predetermined period after the initial time point and the first and second round parameters correspond to each other. Next, group proving data are generated according to a reader key, the tag identification data of each of the RFID tags, and the first and second response parameters.

According to a third aspect of the present disclosure, a group proving method applied between a radio frequency identification (RFID) reader and a plurality of RFID tags is provided. The group proving method includes the following steps. First, a query command is broadcasted through the RFID reader. Next, the query command is responded with tag identification data to the RFID reader through each of the RFID tags. Then, a tag set is determined through the RFID reader according to the received tag identification data, and a first round parameter is generated and broadcasted. Next, the first round parameter is stored through each of the RFID tags, a random number parameter is generated, and a first response parameter is generated according to the first round parameter, the random number parameter and a tag key. Next, a second round parameter is generated and broadcasted through the RFID reader according to the first response parameter corresponding to each of the RFID tags. Then, it is determined whether each of the RFID tags receives the second round parameter, provided by the RFID reader, in a predetermined period after an initial time point of receiving the first round parameter through each of the RFID tags, and whether the second round parameter corresponds to the first round parameter. Next, the tag key is updated through each of the RFID tags according to the random number parameter, and a second response parameter is generated and outputted according to the second round parameter, the random number parameter and the updated tag key when the first and second round parameters correspond to each other and the second round parameter is received in the predetermined period after the initial time point. Then, group proving data are generated through the RFID reader according to a reader key, the tag identification data of each of the RFID tags, and the first and second response parameters.

According to a fourth aspect of the present disclosure, a radio frequency identification (RFID) tag group is provided. The RFID tag group includes a plurality of RFID tags so that a group proving operation between the RFID tags and a RFID reader is performed. Each of the RFID tags includes a random number generator, a memory, an encrypting module and a controller. The memory stores a program code and stores tag identification data and a tag key in response to an initialization operation. The controller performs a group proving method according to the program code. The group proving method includes the following steps. First, a first round parameter provided by the RFID reader is stored and a random number parameter is generated. The first round parameter relates to the tag identification data of each of the RFID tags. Next, the encrypting module is driven to generate a first response parameter according to the first round parameter, the random number parameter and the tag key. Then, it is determined whether each of the RFID tags receives a second round parameter, provided by the RFID reader, in a predetermined period after an initial time point of receiving the first round parameter, wherein the second round parameter relates to the first response parameter of the RFID tags. Next, it is determined whether the first and second round parameters correspond to each other. Then, the second round parameter is received and the tag key is updated according to the random number parameter when the first and second round parameters correspond to each other and the second round parameter is received in the predetermined period after the initial time point. Next, the encrypting module is driven to generate and output a second response parameter according to the second round parameter, the random number parameter and the updated tag key.

According to a fifth aspect of the present disclosure, a radio frequency identification (RFID) reader for performing a group proving operation with a plurality of RFID tags is provided. The RFID reader includes a plurality of antennas, a memory and a processor. The memory stores a program code and stores a reader key in response to an initialization operation. The processor performs a group proving method according to the program code. The group proving method includes the following steps. First, a query command is broadcasted, wherein each of the RFID tags responds the query command with tag identification data. Next, a tag set is determined according to the received tag identification data and a first round parameter is generated and broadcasted. Each of the RFID tags responds the first round parameter with a first response parameter. The first response parameter relates to the first round parameter, a tag key of each of the RFID tags and a random number parameter generated by each of the RFID tags. Then, a second round parameter is generated and broadcasted according to the first response parameter corresponding to each of the RFID tags. Each of the RFID tags determines whether the second round parameter is received in a predetermined period after an initial time point of receiving the first round parameter and whether the first and second round parameters correspond to each other. If the second round parameter is received in the predetermined period after the initial time point and the first and second round parameters correspond to each other, each of the RFID tags updates the tag key according to the random number parameter, and generates and outputs a second response parameter according to the second round parameter, the random number parameter and the updated tag key. Next, group proving data are generated according to the reader key, the tag identification data of each of the RFID tags and the first and second response parameters.

The above and other aspects of the disclosure will become better understood with regard to the following detailed description of the non-limiting embodiment(s). The following description is made with reference to the accompanying drawings.

DETAILED DESCRIPTION

The group proving method according to the embodiment generates the group proving data through the parallel message exchanges between a radio frequency identification (RFID) reader and multiple RFID tags without being connected to a verification server.

Figure 1:
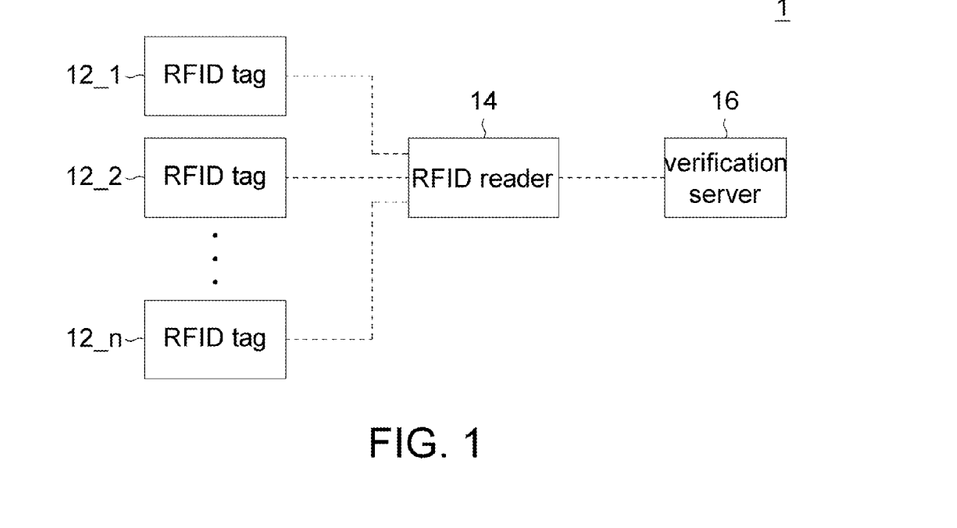
FIG. 1 is a block diagram showing a RFID system according to an embodiment.
Figure 2:
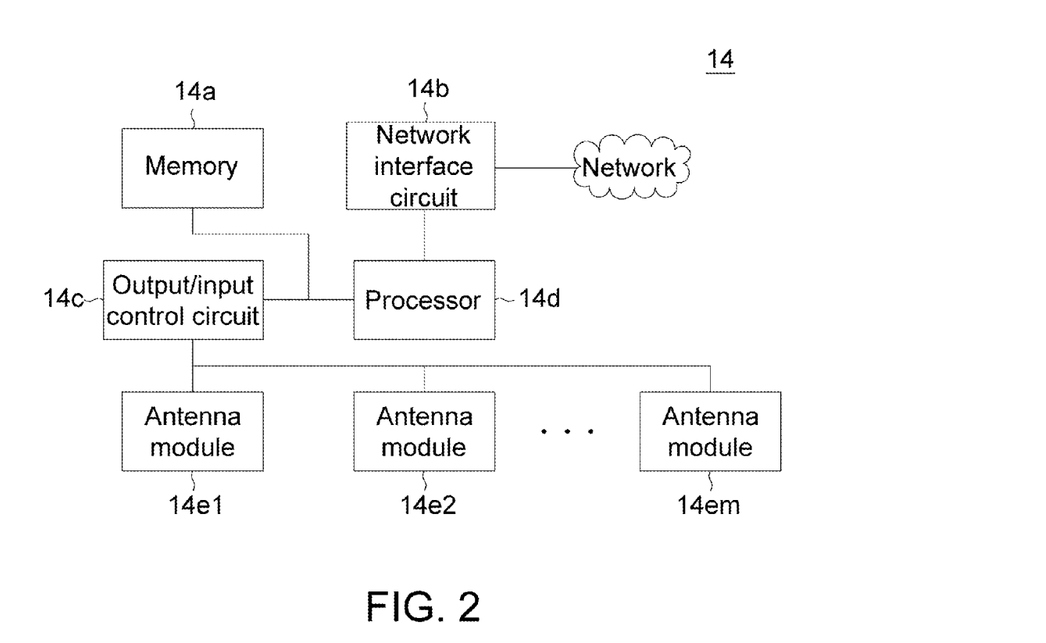
FIG. 2 is a detailed block diagrams showing a RFID reader 14 of FIG. 1.

FIG. 1 is a block diagram showing a RFID system 1 according to an exemplary embodiment. Referring to FIG. 1, the RFID system 1 includes multiple RFID tags 12_1, 12_2, . . . , 12_n, a RFID reader 14 and a verification server 16, wherein n is a natural number greater than 1. In one example, the RFID reader 14 has the block diagram shown in FIG. 2 and includes a memory 14a, a network interface circuit 14b, an output/input control circuit 14c, a processor 14d and antenna modules 14e1, 14e2, . . . , 14em. The memory 14a stores a program code, and the processor 14d executes the program code, stored in the memory 14a, to control the operation of each circuit of the RFID reader 14.

In one example, the RFID tags 12_1 to 12_n have substantially the same circuit structure. Taking the $i^{th}$ RFID tag 12_i in the RFID tags 12_1 to 12_n as an example, it has the block diagram shown in FIG. 3, wherein "i" is a natural number smaller than or equal to n. The RFID tag 12_i includes a controller 12a, a non-volatile memory 12b, a timer 12c, a random access memory (RAM) 12d, a random number generator 12e and an encrypting module 12f. The non-volatile memory 12b stores the program code, the program code in the non-volatile memory 12b is provided to the RAM 12d through the corresponding memory access operation, and the controller 12a executes the program code in the RAM 12d to control the operation of each circuit of the RFID tag 12_i.

The RFID system 1 successively performs an initialization key deployment procedure, a group proof generating procedure, a group proof upload procedure and a proof verifying procedure through the signal exchanging operations between the RFID tags 12_1 to 12_n, the RFID reader 14 and the verification server 16, so that a complete group proving procedure is finished. Next, each of the procedures in the group proving procedure will be described in detail in the following.

Initialization Key Deployment Procedure

In the initialization key deployment procedure, the verification server 16 generates a reader key kreader corresponding to the RFID reader 14, and stores the reader key kreader into the verification server 16. The verification server 16 further stores the reader key kreader into the memory 14a of the RFID reader 14 through the middleware.

Figure 3:
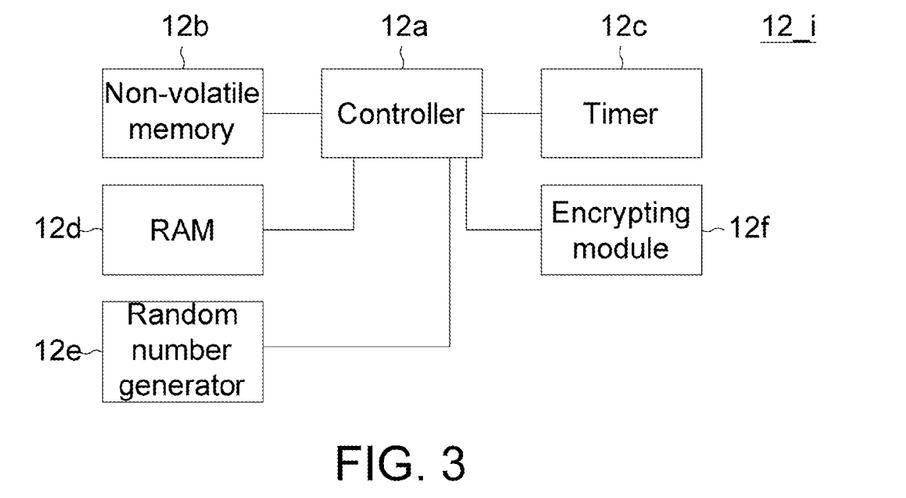
FIG. 3 is a detailed block diagram showing an $i^{th}$ RFID tag 12_i in FIG. 1.

In the initialization key deployment procedure, the verification server 16 further generates tag identification data A1, A2, . . . , An and tag keys k1, k2, . . . , kn respectively corresponding to the RFID tags 12_1 to 12_n, and stores the tag identification data A1 to An, the tag keys k1 to kn and the goods data corresponding to each of the RFID tags 12_1 to 12_n (e.g. the goods information correspondingly labeled with each of the RFID tags 12_1 to 12_n) into the verification server 16. The verification server 16 further writes the tag identification data A1 to An and the tag keys k1 to kn into the non-volatile memory 12b of the RFID tags 12_1 to 12-n. Thus, in the initialization key deployment procedure, the verification server 16 performs the initialization operation on the RFID reader 14 and each of the RFID tags 12_1 to 12_n, so that each of the RFID tags 12_1 to 12_n possesses the corresponding tag identification data A1 to An, tag keys k1 to kn and product information.

Group Proof Generating Procedure

Figure 4:
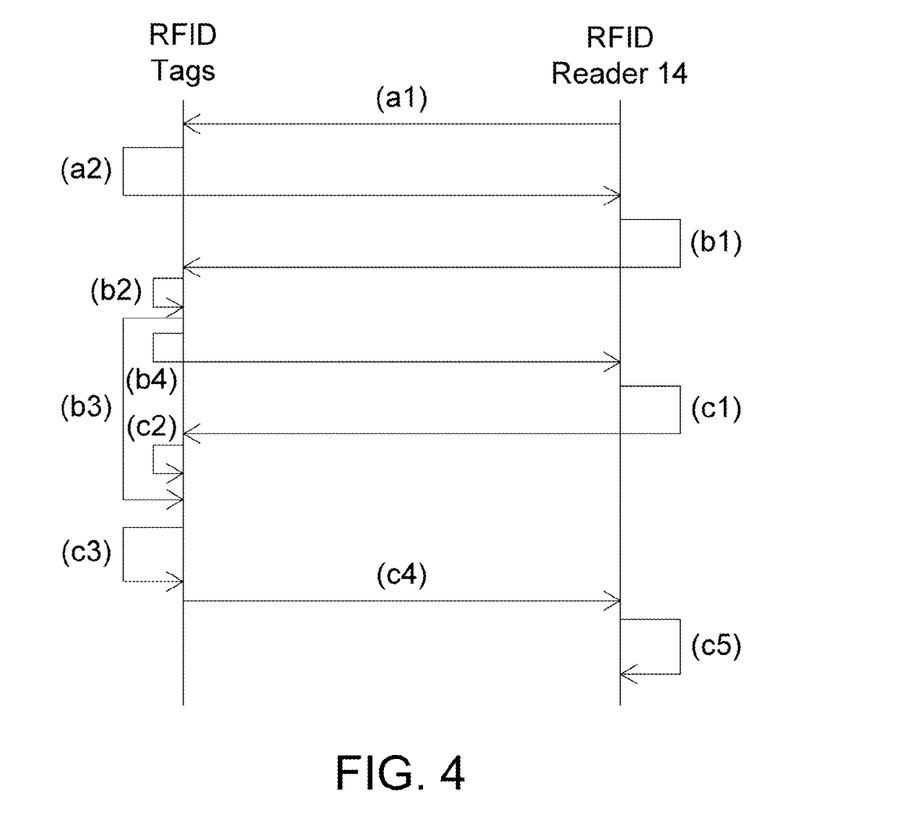
FIG. 4 shows the order of the group proof generating procedures between the RFID reader 14 and the RFID tags 12_1 to 12_n in FIG. 1.

In the group proof generating procedure, the RFID reader 14 and the RFID tags 12_1 to 12_n are in the off-line situation where they are not connected to the verification server 16, and the RFID reader 14 performs the message exchange operations with all the RFID tags 12_1 to 12_n in parallel so as to generate group proving data P. For example, each procedure step in the group proof generating procedure is shown in FIG. 4. FIG. 4 shows the order of the group proof generating procedures between the RFID reader 14 and the RFID tags 12_1 to 12_n in FIG. 1.

After the initialization key deployment procedure, step (a1) is firstly performed, wherein the processor 14d generates a query command and broadcasts the query command to each of the RFID tags 12_1 to 12_n. Next, step (a2) is performed, wherein the controller 12a in each of the RFID tags 12_1 to 12_n receives the query command, and responds the query command with its corresponding tag identification data A1 to An.

Then, step (b1) is performed, wherein the processor 14d determines a RFID tag set corresponding to the generated group proof data P according to the received tag identification data. For example, the processor 14d receives the n tag identification data A1 to An of the n RFID tags 12_1 to 12_n. Thus, this group proof data generating procedure regards the RFID tags 12_1 to 12_n as one RFID tag set, and generates the corresponding group proof data P to indicate whether the RFID tag set satisfies the specific proving condition. The processor 14d generates a round parameter m according to the received tag identification data A1 to An, and broadcasts the round parameter m to each of the RFID tags 12_1 to 12_n. For example, the processor 14d generates the round parameter m through the following hash operation, wherein ∥ represents the concatenation of strings:

$$m = \text{hash}(A_1 \| A_2 \| \ldots \| A_n)$$

Next, step (b2) is performed, wherein the controller 12a in each of the RFID tags 12_1 to 12_n receives and stores the round parameter m. Then, as shown in step (b3), the controller 12a in each of the RFID tags 12_1 to 12_n drives the timer 12c to count the time, and thus determines whether the corresponding RFID tags 12_1 to 12_n receive the round parameters s and m, broadcasted by the RFID reader 14 in the next message exchanging round, in a predetermined period after an initial time point of receiving the round parameter m.

Then, step (b4) is performed, wherein the controller 12a in each of the RFID tags 12_1 to 12_n receives and stores the round parameter m and drives the corresponding random number generator 12e to generate the corresponding random number parameters r1, r2, . . . , rn. The controller 12a in each of the RFID tags 12_1 to 12_n further generates the corresponding responded parameter X1, X2, . . . , Xn through the encrypting module 12f according to the round parameter m and each of the corresponding random number parameters r1 to rn. The controller 12a in each of the RFID tags 12_1 to 12_n further responds with the parameters X1 to Xn to the RFID reader 14. In one example, the steps of generating the responded parameters X1 to Xn by the RFID tags 12_1 to 12_n are substantially the same. Taking the RFID tag 12_i in the RFID tags 12_1 to 12_n as an example, the encrypting module 12f generates the responded parameter Xi through the following encrypting operation (ENC):

$$X_i = \text{ENC}_{k_i}(m \oplus r_i)$$

In other words, the controller 12a in the RFID tag 12_i performs an Exclusive OR (XOR) operation according to the round parameter m and the random number parameter ri, and encrypts the XORed result of the round parameter m and the random number parameter ri according to the tag key ki to generate the corresponding responded parameter Xi.

Then, step (c1) is performed, wherein the processor 14d generates a round parameter s according to responded parameters X1 to Xn, and broadcasts the round parameters s and m to each of the RFID tags 12_1 to 12_n. For example, the processor 14d generates the round parameter s through the following hash operation, wherein ∥ represents the connection of strings:

$$s = \text{hash}(X_1 \| X_2 \| \ldots \| X_n)$$

Next, step (c2) is performed, wherein the controller 12a in each of the RFID tags 12_1 to 12_n receives the round parameters s and m.

In an example, the step (c2) for receiving the round parameters s and m of each of the RFID tags 12_1 to 12_n is performed within the predetermined period started from the initial time point. Thus, each of the RFID tags 12_1 to 12_n can obtain the determined result that the time delay between the time point of receiving the round parameter m and the time point of receiving the round parameters s and m is smaller than the predetermined period in the step (b3).

Step (c3) is performed when the condition of the determined result of the step (b3) is established. The controller 12a in each of the RFID tags 12_1 to 12_n further determines whether the round parameter received in the step (c2) substantially corresponds to the round parameter, received in the step (b2). In detail, the controller 12a in each of the RFID tags 12_1 to 12_n compares the round parameter m, received thereby in the step (c2), with the round parameter m, received thereby in the step (b2), to determine whether the round parameters m are substantially the same and thus to determine whether the round parameters received in the steps (c2) and (b2) substantially correspond to each other.

If the round parameters, received in the steps (c2) and (b2) substantially correspond to each other, then each of the RFID tags 12_1 to 12_n obtains the determined result that the round parameters, received thereby in the steps (c2) and (b2) correspond to each other in the step (c3).

Next, step (c4) is performed, wherein the controller 12a in each of the RFID tags 12_1 to 12_n updates the corresponding tag keys k1 to kn according to the corresponding random number parameters r1 to rn to obtain the updated tag key k1', k2', ..., kn', respectively. The controller 12a in each of the RFID tags 12_1 to 12_n further generates the responded parameters Y1, Y2, ..., Yn through the encrypting module 12f according to the round parameter s, the random number parameters r1 to rn and the updated tag keys k1' to kn', and each of the RFID tags 12_1 to 12_n further responds with the corresponding responded parameters Y1 to Yn to the RFID reader 14. In one example, the steps of the RFID tags 12_1 to 12_n of generating the responded parameters Y1 to Yn are substantially the same. Taking the RFID tag 12_i as an example, it generates the updated tag key ki' and the responded parameter Yi according to the following updating operation and encrypting operation and accordingly backscatters the obtained responded parameter Yi and the tag identification data Ai.

$$k_i' = k_i \oplus r_i$$

$$Y_i = ENC_{k_i'}(s \oplus r_i)$$

Thereafter, step (c5) is performed, wherein the processor 14d receives the responded parameters Y1 to Yn, and generates the group proving data P according to the reader key kreader, each of the tag identification data A1 to An of each of the RFID tags 12_1 to 12_n, and the responded parameters X1 to Xn and Y1 to Yn. For example, the processor 14d generates the group proving data P according to the following encrypting operation:

$$P = ENC_{k_{reader}}(A_1 \| A_2 \| \ldots \| A_n \| X_1 \| X_2 \| \ldots \| X_n \| Y_1 \| Y_2 \| \ldots \| Y_n)$$

Figure 5:
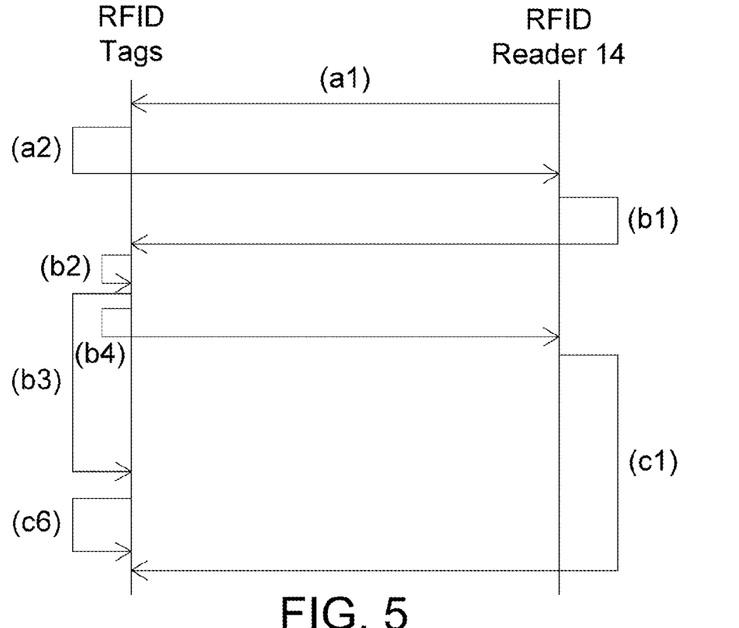
FIG. 5 shows another order of the group proof generating procedures between the RFID reader 14 and the RFID tags 12_1 to 12_n in FIG. 1.
Figure 6:
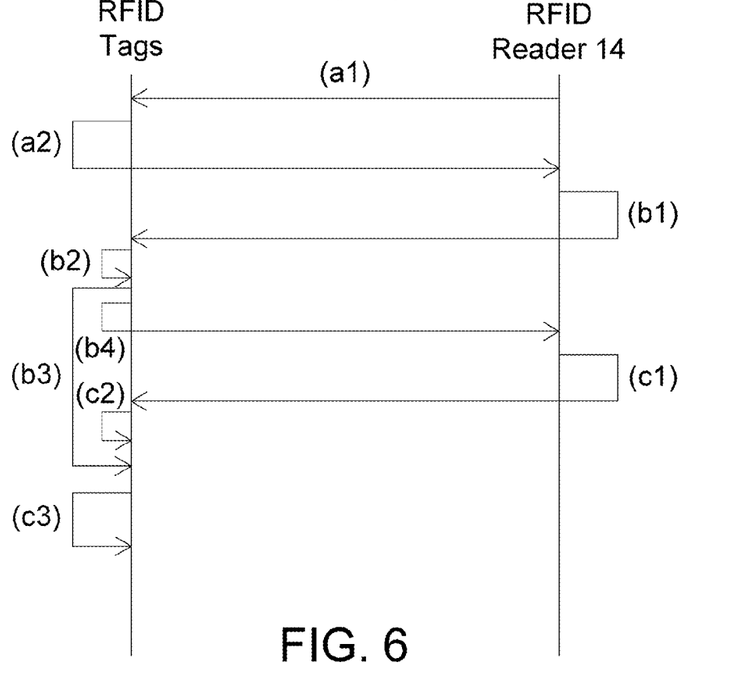
FIG. 6 shows still another order of the group proof generating procedures between the RFID reader 14 and the RFID tags 12_1 to 12_n in FIG. 1.
Figure 7:
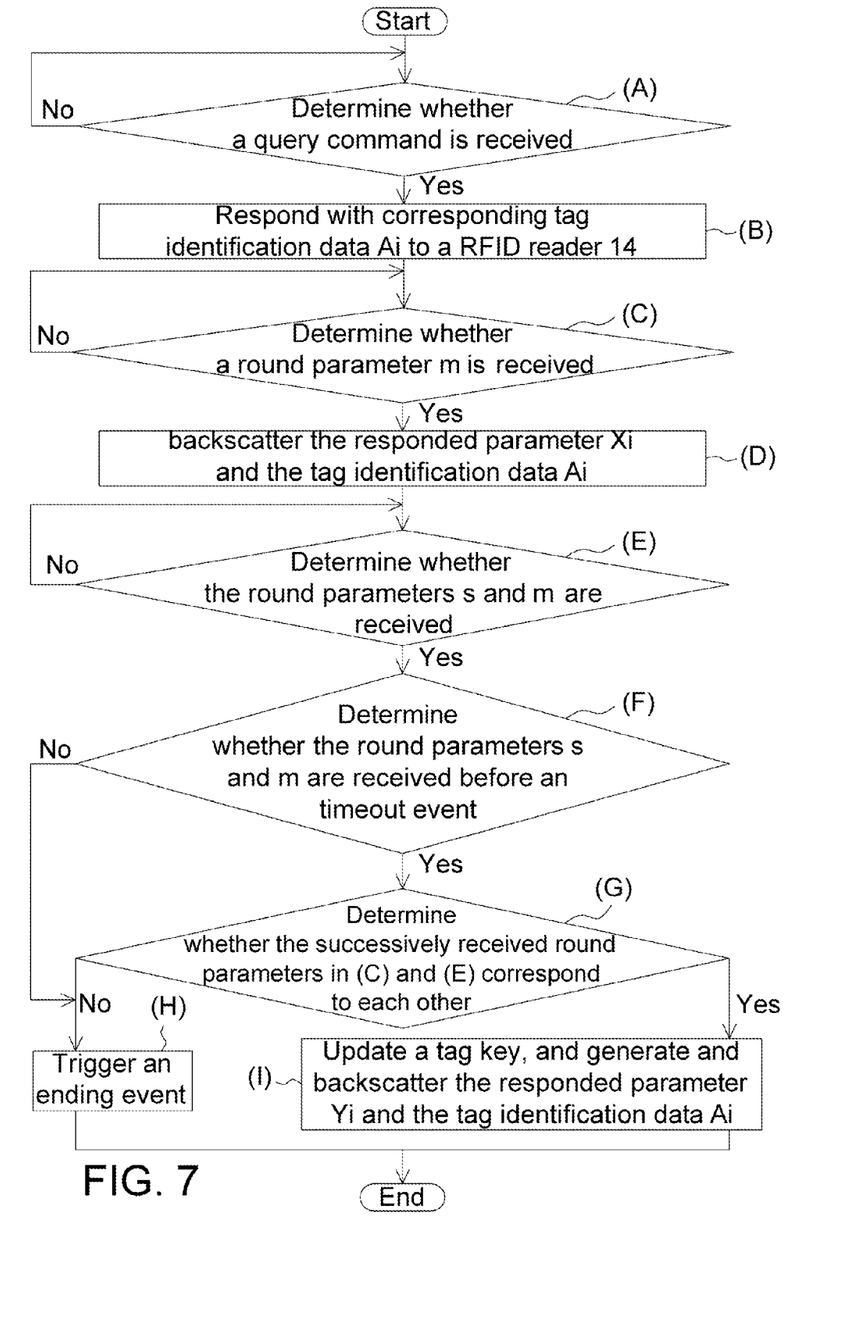
FIG. 7 is a flow chart showing a group proof generating method applied to the end of each of the RFID tags 12_1 to 12_n according to an embodiment.

In other example, if the step for receiving the round parameters s and m of any one of the RFID tags 12_1 to 12_n (e.g. the $y^{th}$ RFID tag 12_y among the RFID tags 12_1 to 12_n, wherein y is a natural number smaller than or equal to n) is performed after the predetermined period started from the initial time point ends, then the sequence diagram of the RFID tag 12_y is shown in FIG. 5. After the predetermined period ends and the step (c2) for receiving the round parameters s and m is not achieved, step (c6) is performed after the step (b3), wherein the controller 12a in the RFID tag 12_y triggers the ending event In other examples, in the step (c3), if the round parameters, received by any one of the RFID tags 12_1 to 12_n (e.g., the $z^{th}$ RFID tag 12_z, wherein z is a natural number smaller than or equal to n) in the steps (b2) and (c2), do not correspond to each other, then sequence diagram of the RFID tag 12_z is shown in FIG. 6. In an example, after the step (c3), the controller 12a in the RFID tag 12_z triggers an ending event FIG. 7 is a flow chart showing a group proof generating method applied to the end of each of the RFID tags 12_1 to 12_n according to an exemplary embodiment. Because the group proving methods performed by the RFID tags 12_1 to 12_n are substantially the same, only the group proving method performed by the RFID tag 12_i will be described in the following. First, as shown in step (A), the RFID tag 12_i determines whether the query command is received. If not, the step (A) is repeated. If so, step (B) is performed, wherein the RFID tag 12_i responds with the corresponding tag identification data Ai to the RFID reader 14.

Then, as shown in step (C), the RFID tag 12_i determines whether the round parameter m is received. If not, the step (C) is repeated. If so, step (D) is performed, wherein the RFID tag 12_i stores the round parameter m, the RFID tag 12_i generates the random number parameter ri, and generates the responded parameter Xi according to the round parameter m, the corresponding random number parameter ri and the corresponding tag key ki and accordingly backscatters the obtained responded parameter Xi and the tag identification data Ai.

Next, as shown in step (E), the RFID tag 12_i determines whether the round parameters s and m are received. If not, the step (E) is repeated. If so, step (F) is performed, wherein the RFID tag 12_i determines whether the round parameters s and m, provided by the RFID reader 14, is received in the predetermined period after the initial time point of receiving the round parameter m, i.e. whether the round parameters s and m are received before a timeout event. If so, step (G) is performed, the RFID tag 12_i determines whether the two round parameters received successively correspond to each other.

When the RFID tag 12_i determines that the two round parameters received successively correspond to each other and that the second round parameter (i.e., the round parameters s and m) is received in the predetermined period after the time point of receiving the first round parameter (i.e., the round parameter m), step (I) is performed. In the step (I), the RFID tag 12_i updates the tag key ki into the updated tag key ki' according to the corresponding random number parameter ri, and generates the responded parameter Yi and the tag identification data Ai according to the round parameter s, the corresponding random number parameter ri and the updated tag key ki', and backscatters the responded parameter Yi and the tag identification data Ai to the RFID reader 14.

When the RFID tag 12_i determines that the two round parameters received successively do not correspond to each other or that the second round parameter (i.e., the round parameters s and m) is not received in the predetermined period after the time point of receiving the first round parameter (i.e., the round parameter m), step (H) is performed, wherein the RFID tag 12_i triggers the ending event.

Figure 8:
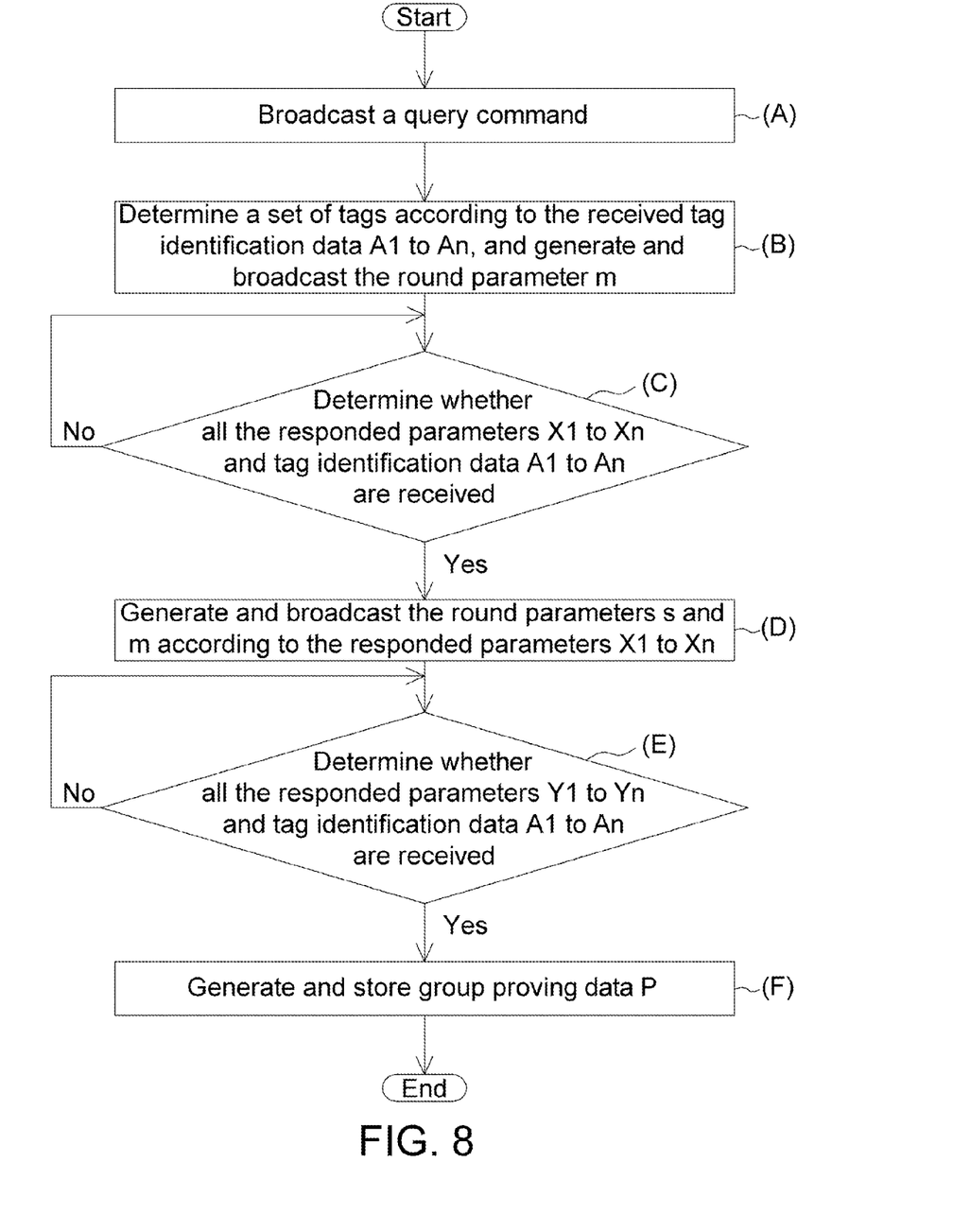
FIG. 8 is a flow chart showing a group proof generating method applied to the RFID reader 14 according to an embodiment.

FIG. 8 is a flow chart showing a group proof generating method applied to the RFID reader 14 according to an exemplary embodiment. First, as shown in step (A), the RFID reader 14 broadcasts the query command to each of the RFID tags 12_1 to 12_n, and the RFID tag, which has received the broadcasted command, correspondingly responds with the tag identification data. For example, all the RFID tags 12_1 to 12_n have received the query command and correspondingly responds with the tag identification data A1 to An. Next, as shown in step (B), the RFID reader 14 generates and broadcasts the round parameter m to each of the RFID tags 12_1 to 12_n according to the tag identification data A1 to An. The RFID tags 12_1 to 12_n correspondingly respond with the responded parameters X1 to Xn, which relate to the round parameter m, the tag keys k1 to kn of the RFID tags 12_1 to 12_n and the random number parameters r1 to rn generated by the RFID tags, respectively.

Then, step (C) is performed, wherein the RFID reader 14 determines whether the responded parameters X1 to Xn and the tag identification data A1 to An of all the RFID tags 12_1 to 12_n have been received. If not, the step (C) is repeated. If so, the step (D) is performed, and the RFID reader 14 generates and broadcasts the round parameters s and m to the RFID tags 12_1 to 12_n according to the responded parameters X1 to Xn.

Next, step (E) is performed, wherein the RFID reader 14 determines whether the responded parameters Y1 to Yn and the tag identification data A1 to An of all the RFID tags 12_1 to 12_n have been received. If not, the step (E) is repeated. If so, step (F) is performed, wherein the RFID reader 14 generates the group proving data P according to the reader key kreader, the tag identification data A1 to An and the responded parameters X1 to Xn and Y1 to Yn, and stores the group proving data P into the memory 14a.

Group Proof Upload Procedure And Proof Verifying Procedure

Figure 9:
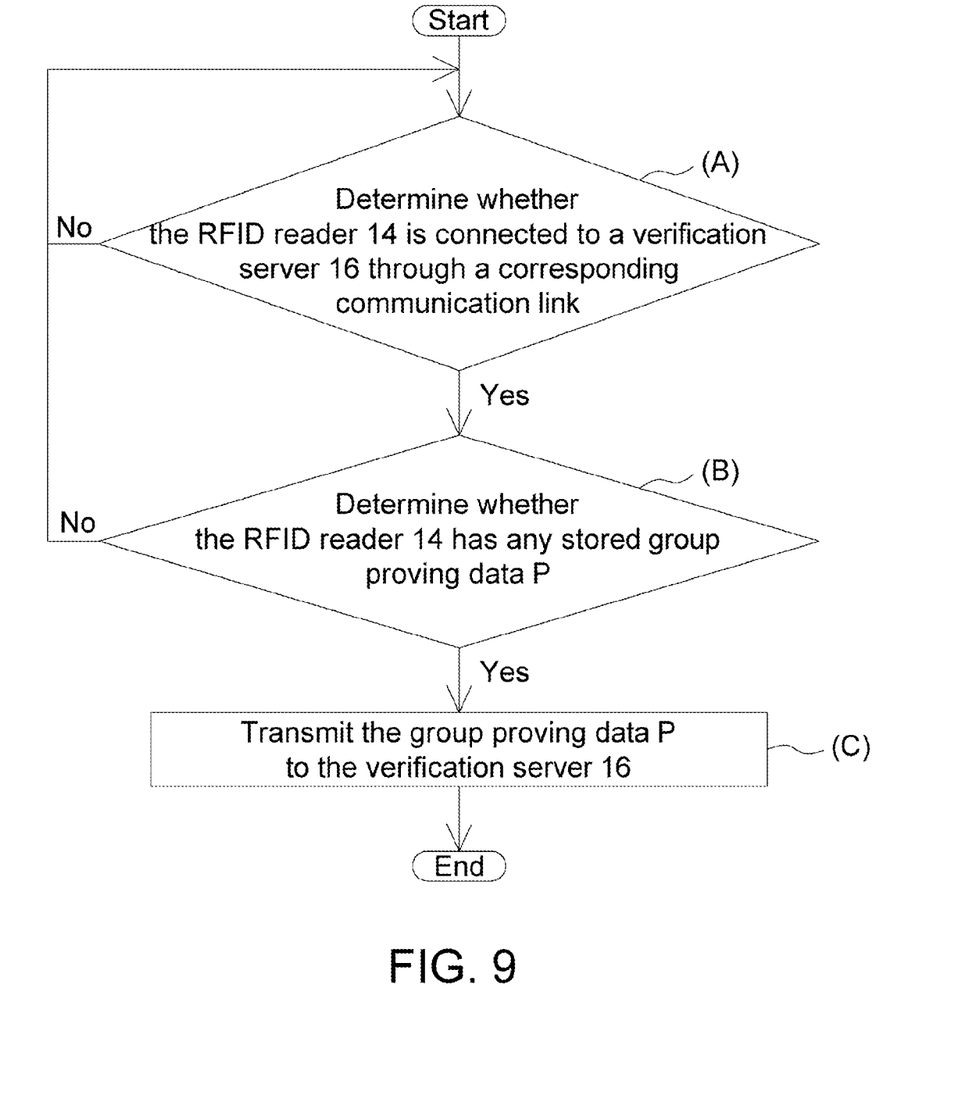
FIG. 9 is a flow chart showing a group proof uploading method according to an embodiment.

FIG. 9 is a flow chart showing a group proof uploading method according to an embodiment. First, as shown in step (A), the processor 14d queries the network interface circuit 14b to determine whether the RFID reader 14 is connected to the verification server 16 through the corresponding communication link. If not, the step (A) is repeated. If so, step (B) is performed, wherein the processor 14d further determines whether the memory 14a has stored the group proving data P. If not, the step (A) is performed. If so, step (C) is performed, wherein the processor 14d drives the network interface circuit 14b to transmit the group proving data P to the verification server 16.

Figure 10:
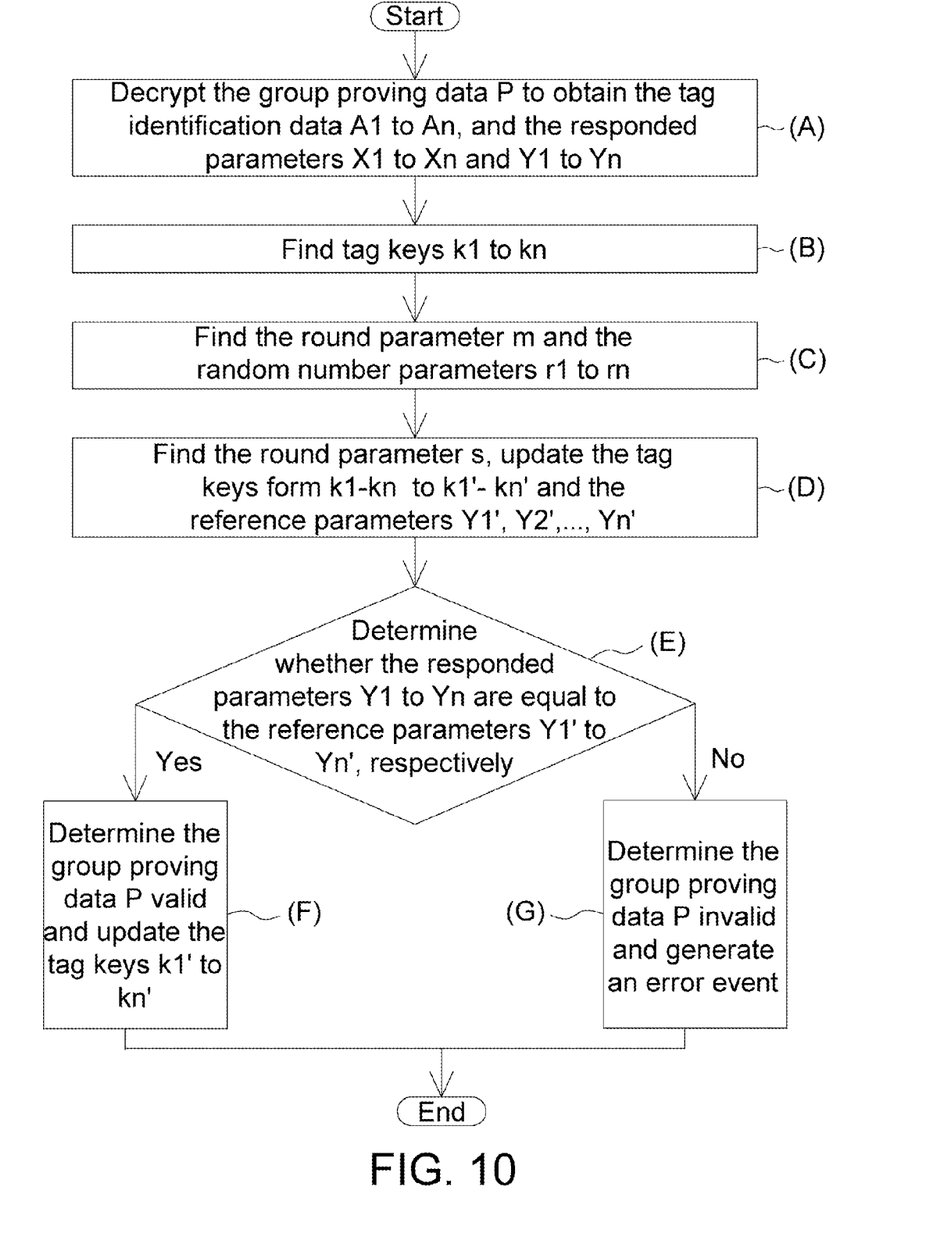
FIG. 10 is a flow chart showing a proof verifying method according to an embodiment.

FIG. 10 is a flow chart showing a proof verifying method according to an embodiment. First, as shown in step (A), the verification server 16 decrypts the group proving data P according to the pre-stored reader key kreader to obtain the tag identification data A1 to An and the responded parameters X1 to Xn and Y1 to Yn. Next, as shown in step (B), the verification server 16 further obtains the tag keys k1 to kn corresponding to the RFID tags 12_1 to 12_n according to the tag identification data A1 to An, respectively.

Then, as shown in step (C), the verification server 16 performs the hash operation according to the tag identification data A1 to An to generate the round parameter m, and generates the random number parameters r1 to rn according to the responded parameters X1 to Xn, the tag keys k1 to kn and the round parameter m. Next, as shown in step (D), the verification server 16 further performs the hash operation according to the responded parameters X1 to Xn to generate the round parameter s, calculates the updated tag keys k1' to kn' according to the random number parameters r1 to rn and the tag keys k1 to kn, and calculates the reference parameters Y1', Y2', . . . , Yn' according to the round parameter s, the random number parameters r1 to rn and the updated tag keys k1' to kn'.

Next, as shown in step (E), the verification server 16 determines whether the responded parameters Y1 to Yn, obtained in the step (A), are equal to the reference parameters Y1' to Yn', respectively. If so, step (F) is performed, wherein the verification server 16 determines that the group proving data P is valid and the proof succeeds, and the verification server 16 updates the tag keys corresponding to the RFID tags 12_1 to 12_n into the updated tag keys k1' to kn'. When the conditions that the responded parameters Y1 to Yn are respectively equal to the reference parameters Y1' to Yn' have not been established, i.e. any one of the responded parameters Y1 to Yn is not equal to its corresponding reference parameters Y1' to Yn', step (G) is performed, wherein the verification server 16 determines that the group proving data P is invalid and the proof fails, and the verification server 16 further generates an error event to inform the user that the proved result indicates that the article may be lost or stealthily exchanged.

Though only the situation that the group proving data corresponding to the RFID reader 14 are transmitted to the verification server 16 is disclosed in the present embodiment, the RFID system 1 is not limited thereto. In other example, two or more than two sets of group proving data, which are collected by one or more than one RFID reader, may also be transmitted to the verification server 16 while corresponding communication links exist. In other words, the verification server 16 may also be capable of handling two or more than two sets of group proving data.

The group proving method according to the exemplary embodiment performs the signal exchanging operations with the RFID tags in parallel through the RFID reader so that the group proof electric record capable of proving all the RFID tags being co-existed can be generated. Thus, compared with the conventional RFID technology, the group proving method of this embodiment has the advantage of generating the group proving data through the parallel signal exchanges between the RFID reader and the RFID tags.

In addition, no group key is provided in the RFID tag used in the group proving method of this embodiment to set the grouping relationship of each of the RFID tags in advance, and the RFID tag set on which the group proving operation is to be performed is determined through the query command/tag identification data message exchanges between the RFID reader and the RFID tags. Thus, compared with the conventional RFID technology, the group proving method of this embodiment further has the advantage of flexibly performing the group proving operation on the arbitrarily selected RFID tag set.

Furthermore, each of the RFID tags and the RFID reader adopting the group proving method of this embodiment has the sufficient computing power to perform the calculating operations, such as the associated key encrypting of the group proving data, the hashing and the random number generating. In other words, the group proving method of this embodiment may be performed in the off-line situation in which the RFID reader and the RFID tags are disconnected with the verification server. Thus, compared with the conventional RFID technology, the group proving method of this embodiment has the advantage of generating the group proving data in the off-line situation.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A group proving method applied to a plurality of radio frequency identification (RFID) tags to perform a group proving operation together with a RFID reader, the group proving method comprising the steps of: generating a random number parameter in response to a first round parameter provided by the RFID reader, wherein the first round parameter relates to tag identification data of each of the RFID tags; generating a first response parameter according to the first round parameter, the random number parameter and a tag key; determining whether each of the RFID tags receives a second round parameter provided by the RFID reader in a predetermined period after an initial time point of receiving the first round parameter, wherein the second round parameter relates to the first response parameter of the RFID tags; determining whether the first and second round parameters correspond to each other; updating the tag key according to the random number parameter when the first and second round parameters correspond to each other and the second round parameter is received in the predetermined period after the initial time point; and generating and outputting a second response parameter according to the second round parameter, the random number parameter and the updated tag key; calculating a first operation parameter according to the first round parameter and the random number parameter; and encrypting the first operation parameter to generate the first response parameter according to the tag key; calculating a second operation parameter according to the second round parameter and the random number parameter; and encrypting the second operation parameter to generate and output the second response parameter according to the updated tag key.

2. The method according to claim 1, further comprising, after the step of determining whether each of the RFID tags receives the second round parameter in the predetermined period after the initial time point, the step of: triggering an ending event through each of the RFID tags when the second round parameter is not received in the predetermined period after the initial time point.

3. The method according to claim 1, further comprising, after the step of determining whether the first and second round parameters correspond to each other, the step of: triggering an ending event through each of the RFID tags when it is determined that the second round parameter does not correspond to the first round parameter.

4. The method according to claim 1, further comprising the steps of: initializing the RFID tags to make each of the RFID tags have the tag identification data and the tag key; and providing the tag identification data of each of the RFID tags to the RFID reader in response to a query command provided by the RFID reader; wherein the RFID reader determines a tag set and generates the first round parameter according to the received tag identification data.

5. A group proving method applied to a radio frequency identification (RFID) reader to perform a group proving operation together with a plurality of RFID tags, the group proving method comprising the steps of: broadcasting a query command, wherein each of the RFID tags responds the query command with tag identification data; determining a tag set according to the received tag identification data, and generating and broadcasting a first round parameter, wherein each of the RFID tags responds the first round parameter with a first response parameter, and the first response parameter relates to the first round parameter, a tag key of each of the RFID tags and a random number parameter generated by each of the RFID tags; generating and broadcasting a second round parameter according to the first response parameter corresponding to each of the RFID tags, wherein each of the RFID tags determines whether the second round parameter is received in a predetermined period after an initial time point of receiving the first round parameter and whether the first and second round parameters correspond to each other, and each of the RFID tags updates the tag key according to the random number parameter, and generates and outputs a second response parameter according to the second round parameter, the random number parameter and the updated tag key if the second round parameter is received in the predetermined period after the initial time point and the first and second round parameters correspond to each other; and generating group proving data according to a reader key, the tag identification data of each of the RFID tags, and the first and second response parameters; calculating a first operation parameter according to the first round parameter and the random number parameter; and encrypting the first operation parameter to generate the first response parameter according to the tag key; calculating a second operation parameter according to the second round parameter and the random number parameter; and encrypting the second operation parameter to generate and output the second response parameter according to the updated tag key.

6. The method according to claim 5, further comprising the step of: initializing the RFID reader to make the RFID reader have the reader key.

7. The method according to claim 5, further comprising the step of: determining whether the RFID reader is connected to a verification server through a communication link; determining whether the RFID reader has the group proving data; and transmitting the group proving data to the verification server when the RFID reader is connected to the verification server through the communication link and the RFID reader has the group proving data; wherein the verification server decrypts the group proving data according to the pre-stored reader key, the tag identification data of each of the RFID tags and the tag key of each of the RFID tags to audit the group proving data.

8. The method according to claim 5, wherein the step of generating and broadcasting the first round parameter according to the tag identification data corresponding to each of the RFID tags comprises: hashing the tag identification data of the RFID tags to find the first round parameter.

9. The method according to claim 5, wherein the step of generating and broadcasting the second round parameter according to the first response parameter corresponding to each of the RFID tags comprises: hashing the first response parameter of the RFID tags to find the second round parameter.

10. The method according to claim 5, wherein the step of generating the group proving data according to the reader key, the tag identification data of each of the RFID tags, and the first and second response parameters comprises: encrypting the tag identification data, the first response parameter and the second response parameter, responded by each of the RFID tags, according to the reader key to generate and store the group proving data.

11. A group proving method applied between a radio frequency identification (RFID) reader and a plurality of RFID tags, the group proving method comprising the steps of: broadcasting a query command through the RFID reader; responding the query command with tag identification data to the RFID reader through each of the RFID tags; determining a tag set through the RFID reader according to the received tag identification data, and generating and broadcasting a first round parameter; storing the first round parameter through each of the RFID tags, generating a random number parameter, and generating a first response parameter according to the first round parameter, the random number parameter and a tag key; generating and broadcasting a second round parameter through the RFID reader according to the first response parameter corresponding to each of the RFID tags; determining whether each of the RFID tags receives the second round parameter, provided by the RFID reader, in a predetermined period after an initial time point of receiving the first round parameter through each of the RFID tags, and determining whether the second round parameter corresponds to the first round parameter; updating the tag key through each of the RFID tags according to the random number parameter, and generating and outputting a second response parameter according to the second round parameter, the random number parameter and the updated tag key when the first and second round parameters correspond to each other and the second round parameter is received in the predetermined period after the initial time point; and generating group proving data through the RFID reader according to a reader key, the tag identification data of each of the RFID tags, and the first and second response parameters; calculating a first operation parameter according to the first round parameter and the random number parameter; and encrypting the first operation parameter to generate the first response parameter according to the tag key; calculating a second operation parameter according to the second round parameter and the random number parameter; and encrypting the second operation parameter to generate and output the second response parameter according to the updated tag key.

12. The method according to claim 11, further comprising the steps of: initializing the RFID tags to make each of the RFID tags have the tag identification data and the tag key; and initializing the RFID reader to make the RFID reader have the reader key.

13. The method according to claim 11, further comprising, after the step of determining whether each of the RFID tags receives the second round parameter in the predetermined period after the initial time point, the step of: triggering an ending event through each of the RFID tags when the second round parameter is not received in the predetermined period after the initial time point.

14. The method according to claim 11, further comprising, after the step of determining whether the first and second round parameters correspond to each other, the step of: triggering an ending event through each of the RFID tags when it is determined that the second round parameter does not correspond to the first round parameter.

15. The method according to claim 11, further comprising the steps of: determining whether the RFID reader is connected to a verification server through a communication link; determining whether the RFID reader has the group proving data; and transmitting the group proving data to the verification server when the RFID reader is connected to the verification server through the communication link and the RFID reader has the group proving data; wherein the verification server decrypts the group proving data according to the pre-stored reader key, the tag identification data of each of the RFID tags and the tag key of each of the RFID tags to audit the group proving data.

16. A radio frequency identification (RFID) tag group, comprising a plurality of RFID tags so that a group proving operation between the RFID tags and a RFID reader is performed, each of the RFID tags comprising: a random number generator; a memory for storing a program code and storing tag identification data and a tag key in response to an initialization operation; an encrypting module; and a controller for performing a group proving method according to the program code, the group proving method comprising the steps of: storing a first round parameter provided by the RFID reader and generating a random number parameter, wherein the first round parameter relates to the tag identification data of each of the RFID tags; driving the encrypting module to generate a first response parameter according to the first round parameter, the random number parameter and the tag key; determining whether each of the RFID tags receives a second round parameter, provided by the RFID reader, in a predetermined period after an initial time point of receiving the first round parameter, wherein the second round parameter relates to the first response parameter of the RFID tags; determining whether the first and second round parameters correspond to each other; receiving the second round parameter and updating the tag key according to the random number parameter when the first and second round parameters correspond to each other and the second round parameter is received in the predetermined period after the initial time point; and driving the encrypting module to generate and output a second response parameter according to the second round parameter, the random number parameter and the updated tag key; calculating a first operation parameter according to the first round parameter and the random number parameter; and encrypting the first operation parameter to generate the first response parameter according to the tag key; calculating a second operation parameter according to the second round parameter and the random number parameter; and encrypting the second operation parameter to generate and output the second response parameter according to the updated tag key.

17. A radio frequency identification (RFID) reader for performing a group proving operation with a plurality of RFID tags, the RFID reader comprising: a plurality of antennas; a memory for storing a program code and storing a reader key in response to an initialization operation; and a processor for performing a group proving method according to the program code, the group proving method comprising the steps of: broadcasting a query command, wherein each of the RFID tags responds the query command with tag identification data; determining a tag set according to the received tag identification data and generating and broadcasting a first round parameter, wherein each of the RFID tags responds the first round parameter with a first response parameter, wherein the first response parameter relates to the first round parameter, a tag key of each of the RFID tags and a random number parameter generated by each of the RFID tags; generating and broadcasting a second round parameter according to the first response parameter corresponding to each of the RFID tags, wherein each of the RFID tags determines whether the second round parameter is received in a predetermined period after an initial time point of receiving the first round parameter and whether the first and second round parameters correspond to each other, wherein if the second round parameter is received in the predetermined period after the initial time point and the first and second round parameters correspond to each other, each of the RFID tags updates the tag key according to the random number parameter, and generates and outputs a second response parameter according to the second round parameter, the random number parameter and the updated tag key; and generating group proving data according to the reader key, the tag identification data of each of the RFID tags and the first and second response parameters; calculating a first operation parameter according to the first round parameter and the random number parameter; and encrypting the first operation parameter to generate the first response parameter according to the tag key; calculating a second operation parameter according to the second round parameter and the random number parameter; and encrypting the second operation parameter to generate and output the second response parameter according to the updated tag key.

* * * * *